United States Patent
Kota

(10) Patent No.: US 6,868,471 B1
(45) Date of Patent: Mar. 15, 2005

(54) MEMORY ADDRESS SPACE EXTENSION DEVICE AND STORAGE MEDIUM STORING THEREIN PROGRAM THEREOF

(75) Inventor: Yoshihiro Kota, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/551,799

(22) Filed: Apr. 18, 2000

(30) Foreign Application Priority Data

Apr. 20, 1999 (JP) .......................................... 11-112368
Jan. 19, 2000 (JP) ...................................... 2000-014102

(51) Int. Cl.⁷ ............................................ G06F 12/00
(52) U.S. Cl. ......................... 711/2; 711/163; 711/202
(58) Field of Search ............................ 711/2, 109, 154, 711/163, 164, 202, 200; 718/100; 713/202; 709/109

(56) References Cited

U.S. PATENT DOCUMENTS

| | | | | |
|---|---|---|---|---|
| 5,758,060 A | * | 5/1998 | Little et al. ................... | 714/30 |
| 5,835,963 A | * | 11/1998 | Yoshioka et al. ........... | 711/207 |
| 5,890,189 A | * | 3/1999 | Nozue et al. ................ | 711/100 |
| 6,091,414 A | * | 7/2000 | Kraft et al. .................. | 345/807 |
| 6,711,605 B2 | * | 3/2004 | Sekiguchi et al. .......... | 718/100 |

FOREIGN PATENT DOCUMENTS

| | | |
|---|---|---|
| JP | 3-52046 | 3/1991 |
| JP | 5-134309 | 5/1993 |
| JP | 5-134930 | 6/1993 |
| JP | 5-257811 | 10/1993 |
| JP | 8-212140 | 8/1996 |
| JP | 9-311821 | 12/1997 |
| JP | 10-49443 | 2/1998 |
| JP | 11-338714 | 12/1999 |

OTHER PUBLICATIONS

Copy of Japanese Office Action dated Jul. 22, 2003 (and English translation of relevant portion).

* cited by examiner

Primary Examiner—Pierre M. Vital
(74) Attorney, Agent, or Firm—Dickstein, Shapiro, Morin & Oshinsky, LLP.

(57) ABSTRACT

A memory address space extension device enables rewrite of data area caused by wrong access from the task to be prevented. A data area access right definition table is provided in a cache. The data area access right definition table defines whether or not a task (or interruption processing) during execution is permitted to access to a data area. An address operational unit extracts data area ID from a CPU address inputted from a CPU 1. A register bank control unit refers to above described definition table within the cache. The register bank control unit judges the access right of the task for the data area from both of a task ID (or interruption number of an interruption processing) of the task during execution stored in the ID register, and the data area ID extracted previously. When the access right is not permitted, system error occurs, while when the access right is permitted, processing for converting above-described CPU address into an extended address is implemented.

124 Claims, 8 Drawing Sheets

F I G. 1
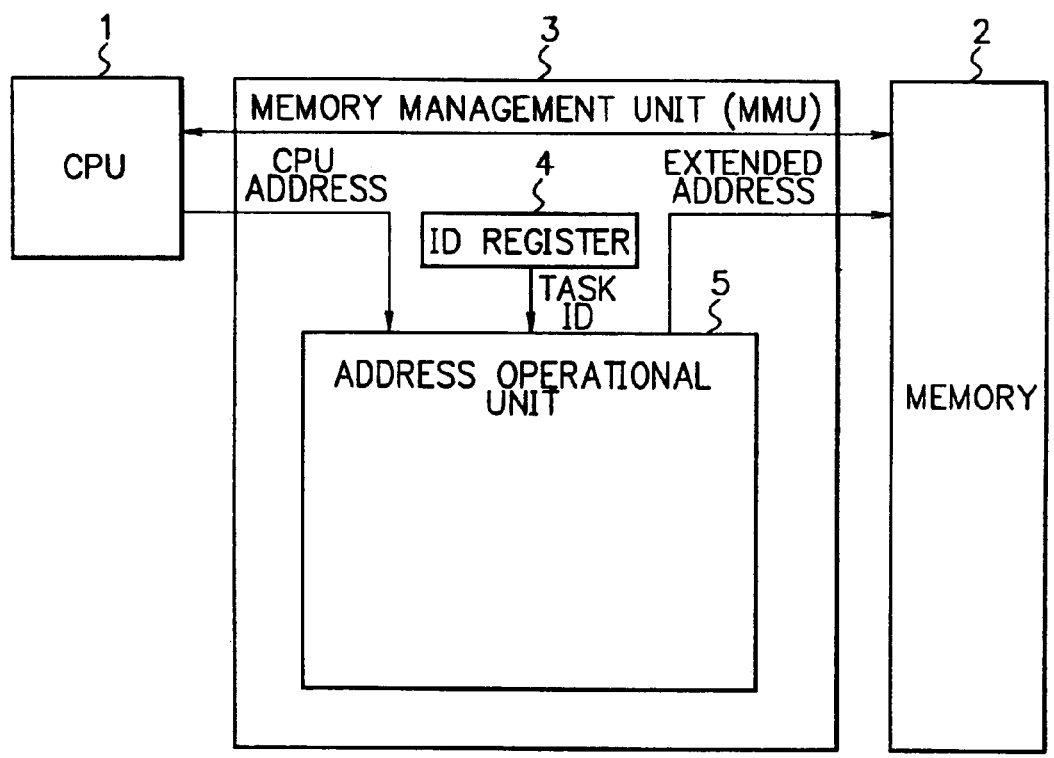

REGISTER BANK SELECTION TABLE 10

| DATA AREA ID | BANK NUMBER |
|---|---|
|  |  |
|  |  |
|  |  |
|  |  |
|  |  |

DATA AREA ACCESS RIGHT DEFINITION TABLE 11

| TASK ID | AREA A | AREA B | AREA C | | |
|---|---|---|---|---|---|
| 1 | O | X | O | | |
| 2 | O | O | O | | |
| 3 | X | O | X | | |
| 4 | X | X | O | | |
| | | | | | |
| | | | | | |
| | | | | | |

X ------- IN-PERMISSIBLE
O ------- PERMISSIBLE

OBJECT FILE
↓
LINKER/LOCATOR ←——— DATA CLASS DEFINITION FILE
↓
EXECUTION FORM FILE

DATA CLASS DEFINITION FILE

```
#DATA_AREA: A
DATA CLASS: A
{
DATA_AREA_ID=1;
ACCESS TASK:1,2
DATA=DATA1,DATA2,DATA3;
}
```

FIG. 6

DATA AREA ACCESS RIGHT DEFINITION TABLE 11

| TASK ID | AREA A | AREA B | AREA C | | |
|---------|--------|--------|--------|--|--|
| 1 | RW | X | RW | | |
| 2 | R | R | R | | |
| 3 | X | W | X | | |
| 4 | X | X | R | | |
| | | | | | |
| | | | | | |
| | | | | | |

R ---- READABLE, IN-WRITABLE,
W ---- IN-READABLE, WRITABLE,
RW ---- READABLE, WRITABLE,
X ---- IN-READABLE, IN-WRITABLE

FIG. 8

DATA AREA ACCESS RIGHT DEFINITION TABLE  81

| TASK ID OR INTERRUPTION NUMBER | AREA A | AREA B | AREA C | | |
|---|---|---|---|---|---|
| 1 | O | X | O | | |
| 2 | O | X | X | | |
| 3 | X | O | X | | |
| 101 | O | X | O | | |
| 102 | O | O | O | | |
| 103 | X | O | X | | |
| 104 | X | X | O | | |

FIG. 9

DATA AREA ACCESS RIGHT DEFINITION TABLE  91

| TASK ID OR INTERRUPTION NUMBER | AREA A | AREA B | AREA C | | |
|---|---|---|---|---|---|
| 1 | R | X | R | | |
| 2 | RW | X | X | | |
| 3 | X | W | X | | |
| 101 | RW | X | RW | | |
| 102 | R | R | R | | |
| 103 | X | W | X | | |
| 104 | X | X | R | | |

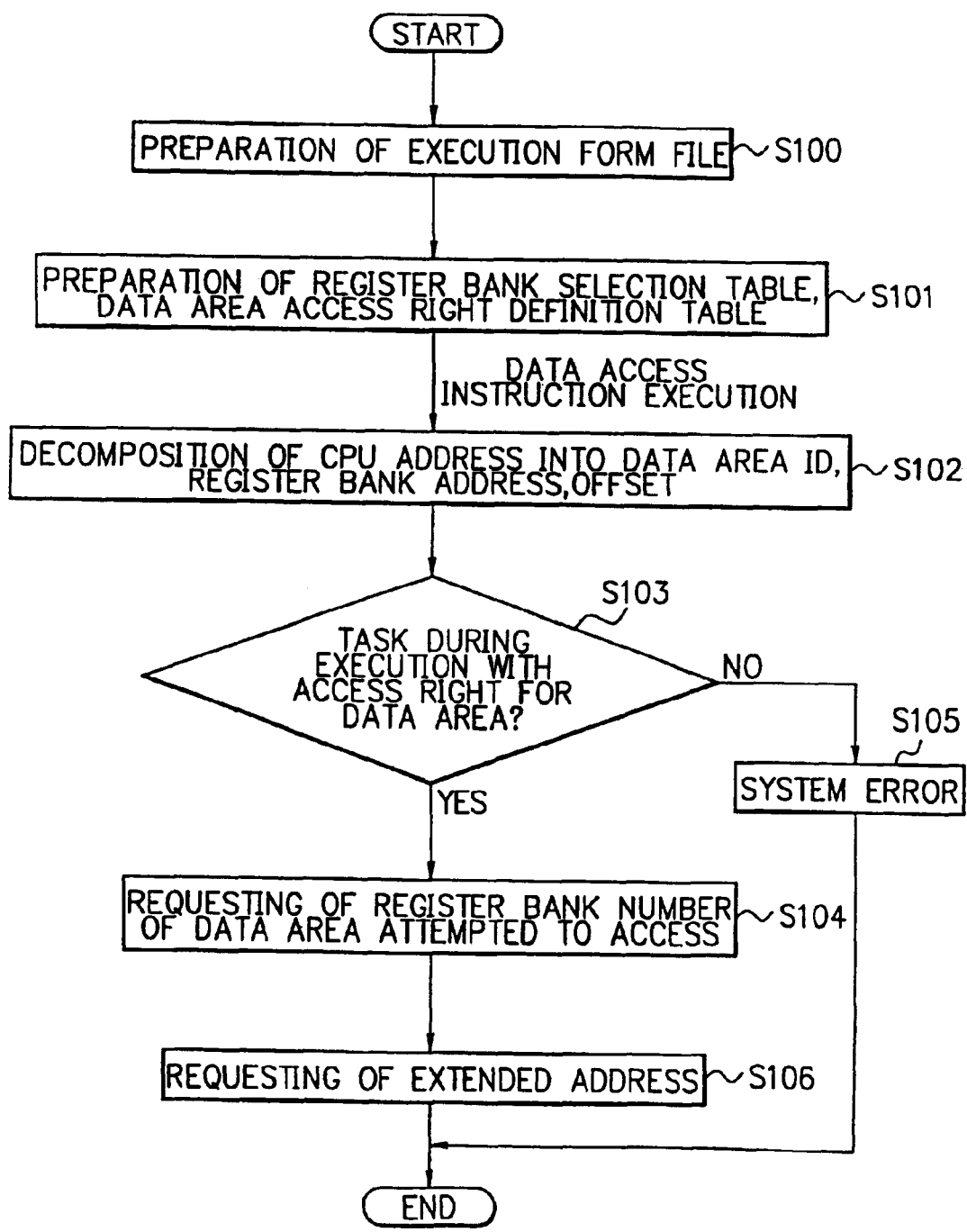

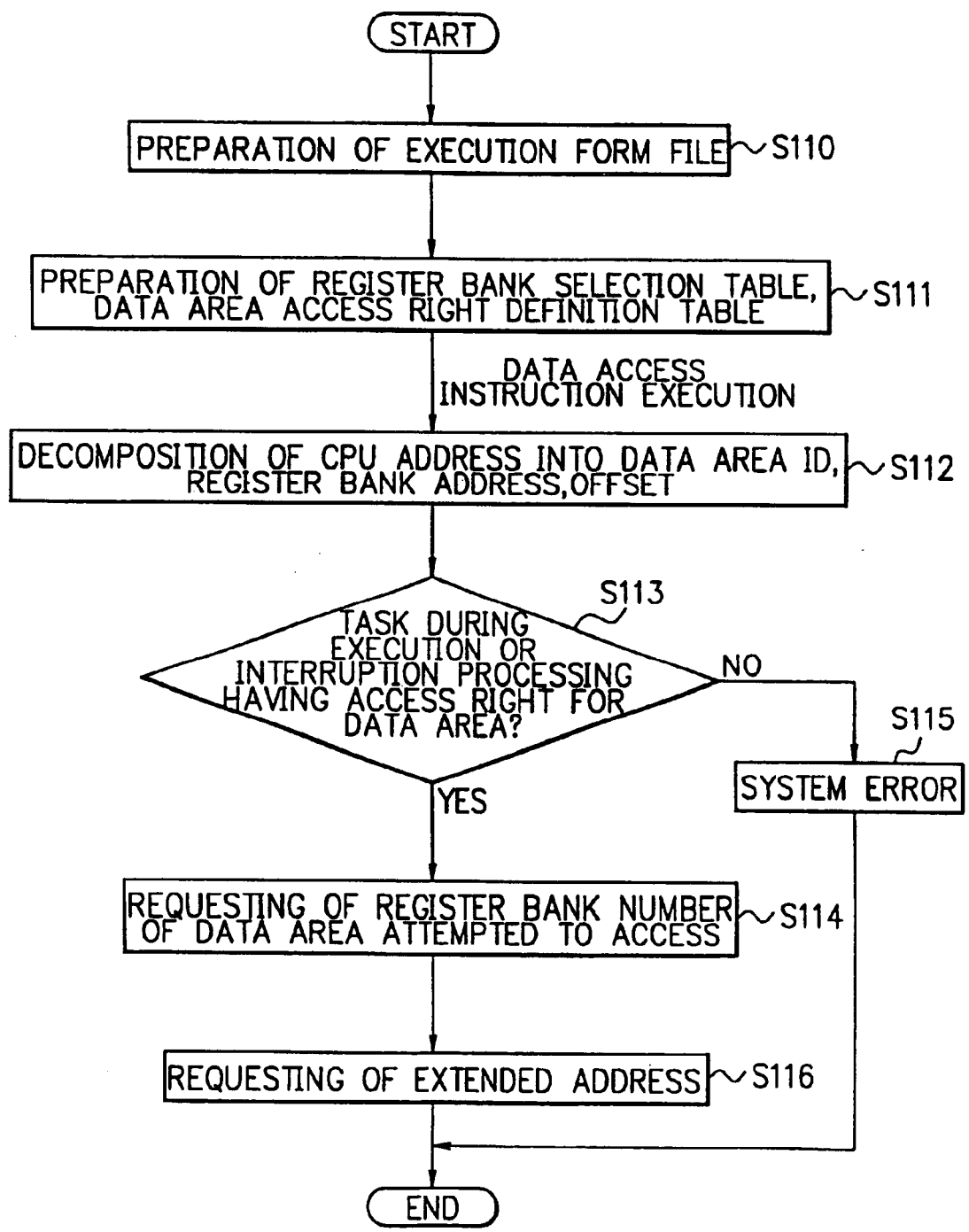

MEMORY ADDRESS SPACE EXTENSION DEVICE AND STORAGE MEDIUM STORING THEREIN PROGRAM THEREOF

BACKGROUND OF THE INVENTION

The present invention relates to a memory address space extension device and a storage medium storing therein a program thereof in which the memory address space extension device converts a CPU (central processing unit) address into an extended address and the program executes processing memory address space extension.

DESCRIPTION OF THE PRIOR ART

A conventional memory address extension device includes a register bank in every task. The register bank consists of a plurality of page registers which are combined therewith. The page register stores therein CPU (central processing unit) address and upward address of extended address which is broader than the CPU address. When task switching occurs, the memory address extension device extends memory address space so as to cause the register bank to be switched.

However, the conventional technique described above presupposes that there exists a data to which only a certain task may access. However, another task may be capable of accessing data to which only the determined certain task should access. Therefore, there is the problem that the data which should only be accessed by the determined certain task is capable of being rewritten wrongly by the another task.

SUMMARY OF THE INVENTION

In view of the foregoing, it is an object of the present invention, in order to overcome the above mentioned problem, to provide a memory address space extension device and a storage medium storing therein a program thereof which enable rewrite data wrongly according to task to be prevented in order to protect the data.

It is another object of the present invention, to provide a memory address space extension device and a storage medium storing therein a program thereof enable the data to which only certain task should access to be prevented from accessing wrongly by interruption processing to such the data in order to protect it.

According to a first aspect of the present invention, in order to achieve the above mentioned object, there is provided a memory address space extension device which comprises a definition table for defining an access right of a task ID (identification) with respect to a data area, a task ID register for storing therein the task ID of a task during execution, an extraction means for extracting a data area ID from a CPU (central processing unit) address inputted previously, a judgement means for judging as to whether or not it is capable of being permitted that the task during execution indicated by the task ID accesses the data area indicated by the data area ID while referring to the definition table from both of data area ID extracted previously and the task ID stored in the task ID register.

According to a second aspect of the present invention, in the first aspect, there is provided a memory address space extension device, wherein there are provided an address operational means for converting the CPU address into an extended address, and a memory having the extended address converted previously, when the judgement means judges that judgement result according to the judgement means is a result that the task during execution accesses the data area, the address operational means executes the conversion processing.

According to a third aspect of the present invention, in the first aspect, there is provided a memory address space extension device, wherein, as to the definition table, it causes combination that access is permissible or impermissible with respect to read and/or write to the data area respectively to be defined.

According to a fourth aspect of the present invention, in the first aspect, there is provided a memory address space extension device, wherein there is provided a forming means for forming said definition table.

According to a fifth aspect of the present invention, there is provided a storage medium for storing therein a program in order to execute the processing of a storing processing for storing a task ID of a task during execution, an extraction processing for extracting a data area ID from a CPU address inputted previously, and a processing for judging as to whether or not it is capable of being permitted that the task during execution indicated by the task ID accesses the data area indicated by the data area ID while referring to the definition table from both of data area ID extracted previously and the task ID stored in the task ID register.

According to a sixth aspect of the present invention, in the fifth aspect, there is provided a storage medium for storing therein a program wherein the program executes the processing of an address operational processing for converting the CPU address into an extended address when judgement result according to the judgement processing is that the task is permitted that the task during execution accesses the data area.

According to a seventh aspect of the present invention, in the sixth aspect, there is provided a memory address space extension device which comprises a definition table for defining an access right of a task with respect to a data area, and an access right judgement means for judging whether or not it causes the access right to the data area which the task requests to be given with respect to the task according to the definition table.

According to an eighth aspect of the present invention, in the seventh aspect, there is provided a memory address space extension device, wherein the definition table defines as to whether or not the task possesses an access right for accessing prescribed data area in every task ID given to the task.

According to a ninth aspect of the present invention, in the seventh aspect, there is provided a memory address space extension device, wherein the definition table defines as to whether or not said task possesses an access right for accessing prescribed data area in every task ID given to the task and/or in every interruption number given to interruption processing.

According to a tenth aspect of the present invention, in the seventh or eighth aspect, there is provided a memory address space extension device, wherein the access right judgement means judges whether it causes the access right to the data area requested by the task to be given according to the task ID, and the data area ID indicating the data area requested by the task.

According to an eleventh aspect of the present invention, in the seventh or ninth aspect, there is provided a memory address space extension device, wherein the access right judgement means judges whether it causes the access right to the data area requested by the task to be given according to any one of the task ID and the interruption processing number, and according to the data area ID indicating the data area requested by the task.

According to a twelfth aspect of the present invention, in any one of the seventh to the eleventh aspects, there is provided in a memory address space extension device, wherein the definition table defines whether or not it causes access to be permitted with respect to the prescribed data area in every the task.

According to a thirteenth aspect of the present invention, in any one of the seventh to the eleventh aspects, there is provided a memory address space extension device, wherein the definition table defines any one of:

(1) causing only write of the data to be permitted;
(2) causing read of the data to be permitted;
(3) causing write of the data and read of the data to be permitted; and
(4) causing no-access to be permitted, with respect to the prescribed data area in every said task.

According to a fourteenth aspect of the present invention, in any one of the ninth, the eleventh, the twelfth, and the thirteenth aspects, there is provided a memory address space extension device, wherein there is further provided an interruption number generation means for generating interruption number with respect to interruption processing according to hardware.

According to a fifteenth aspect of the invention, in any one of the ninth, the eleventh, the twelfth, the thirteenth, and the fourteenth aspects, there is provided a memory address space extension device, wherein there is further provided an interruption number decoding means for decoding an interruption number from an interruption instruction with respect to the interruption instruction according to software.

According to a sixteenth aspect of the present invention, in any one of the seventh to the fifteenth aspects, there is provided a memory address space extension device, wherein there is further provided an address operational means for converting the CPU address into the extended address, and a memory having the extended address converted previously wherein the address operational means causes the CPU address to be converted into the extended address when the task is permitted to access to the data area according to the access right judgement means.

According to a seventeenth aspect of the present invention, in any one of the seventh to the sixteenth aspects, there is provided a memory address space extension device wherein there is further provided a definition table forming means for forming the definition table.

According to an eighteenth aspect of the present invention, there is provided a storage medium storing therein a program in order to execute the processing of a definition table preparation processing for preparing a definition table, a reference processing for the sake of the definition table which defines an access right of a task with respect to data area, and an access right judgement processing for judging whether or not it causes the access right for the data area requested by a task to be given to the task according to the definition table.

According to a nineteenth aspect of the present invention, in the eighteenth aspect, there is provided a storage medium storing therein a program, wherein the reference processing for definition table is the reference processing that it causes the definition table defining whether or not the task possesses the access right for accessing prescribed data area to be seen in every task ID given to the task.

According to a twentieth aspect of the present invention, in the eighteenth aspect, there is provided a storage medium storing therein a program, wherein the reference processing for definition table is the reference processing that it causes the definition table defining whether or not the task possesses the access right for accessing prescribed data area to be seen in every task ID given to the task and/or in every interruption number given to the interruption processing.

According to a twenty-first aspect of the present invention, in the eighteenth or nineteenth aspects, there is provided a storage medium storing therein a program, wherein the access right judgement processing judges whether or not the task possesses the access right for accessing prescribed data area according to the task ID and/or the data area ID indicating the data area requested by the task.

According to a twenty-second aspect of the present invention, in the eighteenth or the twentieth aspect, there is provided a storage medium storing therein a program, wherein the access right judgement processing judges whether or not the task possesses the access right for accessing prescribed data area according to any one of the task ID and the interruption processing number and/or the data area ID indicating the data area requested by the task.

According to a twenty-third aspect of the present invention, in any one of the eighteenth to the twenty-second aspects, there is provided a storage medium storing therein a program, wherein the reference processing for definition table is the reference processing that it causes the definition table defining whether or not the task possesses the access right for accessing prescribed data area to be seen in every the task.

According to a twenty-fourth aspect of the present invention, in any one of the eighteenth to the twenty-second aspects, there is provided a storage medium storing therein a program, wherein the program executes the reference processing for definition table, which is the reference processing that it causes any one of:

(1) allowing only write of the data to be permitted;
(2) allowing read of the data to be permitted;
(3) allowing write of the data and read of the data to be permitted; and
(4) allowing no-access to be permitted, to be seen with respect to the prescribed data area in every the task.

According to a twenty-fifth aspect of the present invention, in any one of the twentieth, the twenty-second, the twenty-third, and the twenty-fourth aspects, there is provided a storage medium storing therein a program, wherein the program further executes interruption number generation processing for generating interruption number to interruption processing according to hardware.

According to a twenty-sixth aspect of the present invention, in any one of the twentieth, the twenty-second, the twenty-third, the twenty-fourth, and twenty-fifth aspects, there is provided a storage medium storing therein a program, wherein the program further executes interruption number decoding processing for decoding interruption number from interruption instruction with respect to said interruption instruction according to software.

According to a twenty-seventh aspect of the present invention, in any one of the eighteenth to the twenty-sixth aspects, there is provided a storage medium storing therein a program, wherein the program executes an address operational processing in order to convert a CPU address into an extended address in such a way that the address operational processing causes the CPU address to be converted into the extended address when the task is judged that the task is permitted to access to the data area according to the access right judgement processing, before executing storage processing of the converted address into a memory.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 1 is a first block diagram showing a configuration of a memory address space extension device in an embodiment of the present invention;

FIG. 6 is a second data area access right definition table in the embodiment of the present invention;

FIG. 8 is a third data area access right definition table in the embodiment of the present invention;

FIG. 9 is a fourth data area access right definition table in the embodiment of the present invention;

FIG. 10 is a flowchart explaining a first operation of the memory address space extension device in the embodiment of the present invention; and FIG. 11 is a flowchart explaining a second operation of the memory address space extension device in the embodiment of the present invention.

DETAILED DESCRIPTION OF THE PREFERRED EMBODIMENTS

A preferred embodiment of the present invention will be described in detail accompanying the drawings.

FIG. 1 is a block diagram showing a first embodiment of a memory address space extension device according to the present invention.

In FIG. 1, the memory address space extension device comprises a CPU1 having a certain address space, a memory 2 having extended address which is broader address space than that of the CPU1, and a memory management unit (hereinafter referred to as MMU) 3.

The MMU3 consists of a task ID register 4 storing therein the task ID of a task with execution conditions, and an address operational unit 5 converting a CPU address into an extended address.

Figures 2, 3:
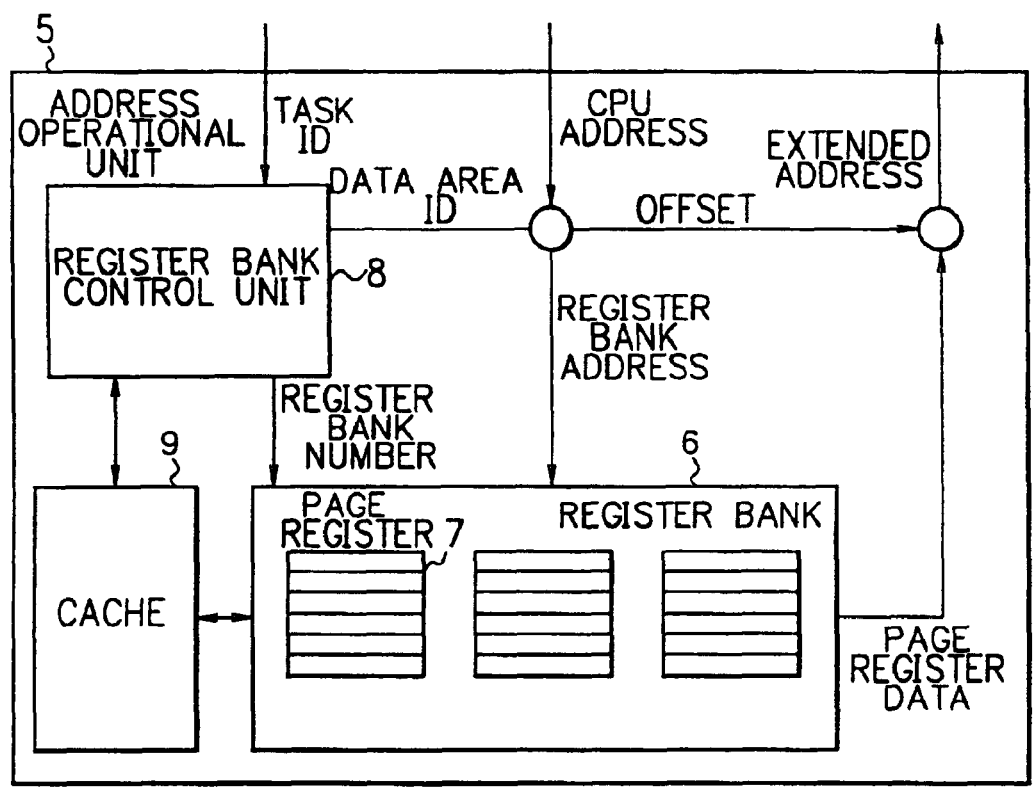
FIG. 2 is a block diagram showing a configuration of an address operational unit in the embodiment of the present invention.
FIG. 3 is a constitution view showing register bank selection table in the embodiment of the present invention.

FIG. 2 is a constitution of the address operational unit 5 of FIG. 1.

In FIG. 2, the address operational unit 5 consists of a page register 7 for storing page register data necessary for calculating the extended address, a plurality of register banks 6 which are combined to be constituted by a plurality of the page registers 7, a register bank control unit 8 for obtaining register bank number from both of data area ID which is a part of the CPU address and task ID, and a cache 9.

Figures 4, 5:
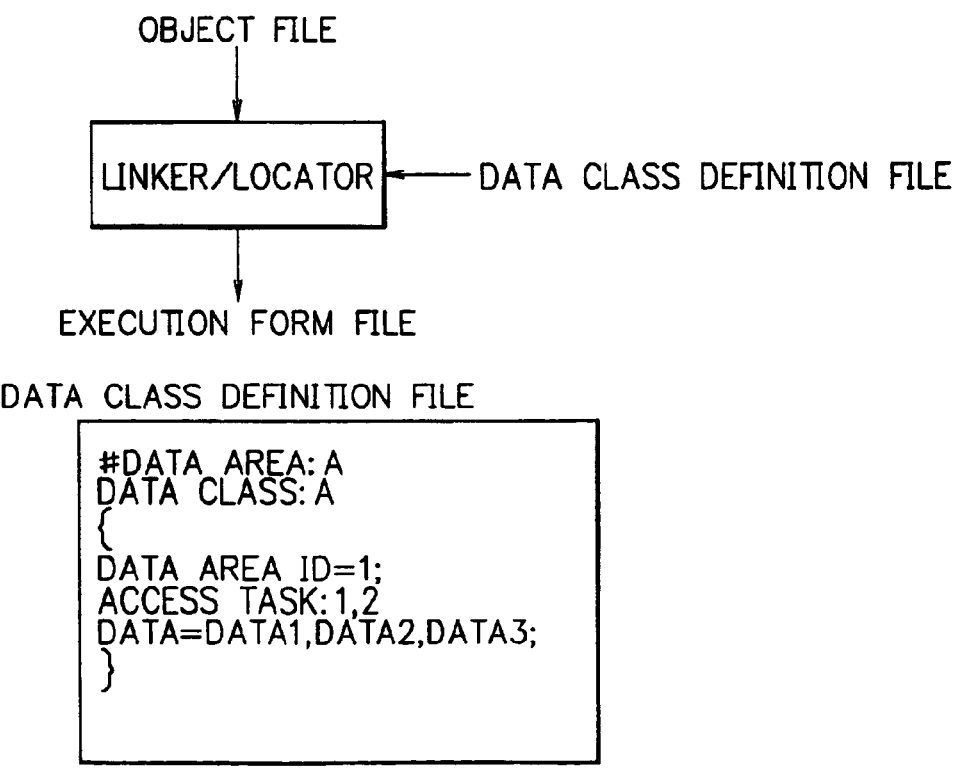
FIG. 4 is a first data area access right definition table in the embodiment of the present invention.
FIG. 5 is a constitution view in the case of forming execution form file from data class definition file in the embodiment of the present invention.

The cache 9 accommodates both of a register bank selection table 10 as shown in FIG. 3 and a data area access right definition table 11 as shown in FIG. 4.

FIRST OPERATION

Next, there will be explained operation.

The address operational unit 5 inputs therein the CPU address from the CPU1. The CPU address consists of data area ID, register bank address, and offset address.

The address operational unit 5 decomposes the inputted CPU address into above data area ID, a register bank address, and an offset in order to extract thereof (STEP S102). Next, a register bank control unit 8 refers to the data area access right definition table 11 existing in the cache 9. The task ID is stored in the task ID register 4. It causes the access right for the data area to be requested to the task during execution from both of the task ID stored in the task ID register 4 and the data area ID which is extracted (STEP S103). When the access is not permitted (STEP S103/NO), the access is not executed to the data area, thus system error occurs (STEP S105).

When the access is permitted (STEP S103/YES), it causes the register bank number of the data area which is attempted to access to be obtained while referring to the register bank selection table 10 existing in the cache 9 (STEP S104). The address operational unit 5 fetches a page register data stored in the page register while selecting the page register from the register bank address. The address operational unit 5 obtains an extended address from the register bank number obtained previously, the page register, and the offset address (STEP S106).

According to such procedure, it is capable of preventing data area from impermissibly being accessed by a task which is not permitted access. Consequently, it is capable of protecting the data from being accessed wrongly by the task which is not permitted accessing thereto.

Next, there will be described operation of the present embodiment using a concrete example.

As shown in FIG. 5, a linker/locator 12 forms and execution form file from among an object file, a data class causing a plurality of data to be gathered, and a data class definition file causing access right of such data class to be defined (STEP S100). On this occasion, the data class arranges the same data while putting them in order. Further, as shown in FIG. 4, on the supposition that the task ID includes the tasks 1, 2, 3, and 4, and the data areas A, B, and C exist. The access right of respective task for the respective data areas is shown in FIG. 4.

Firstly, on the occasion of the initialization, it causes both of a register bank selection table 10 and a data area access right definition table 11 to be formed in the cache 9 (STEP S101).

The CPU 1 executes data access instruction. On this occasion, the address operational unit 5 decomposes the CPU address into the data area ID, the register bank address, and the offset (STEP S102). Next, a register bank control unit 8 refers to the data area access right definition table 11 existing in the cache 9. The register bank control unit 8 requests the access right for the data area with respect to the task during execution from both of the task ID stored in the ID register 4 and the above described data area ID (STEP S103).

As shown in FIG. 4, when the task whose task ID is 1 (one) attempted to read the data existing in the data area B, since the access right is not permitted (STEP S103/NO), the access to the data area B is not executed, thus the system error occurs (STEP S105). When the task whose task ID is 1 (one) attempted to rewrite the data existing in the data area A, since the access right is permitted (STEP S103/YES), it causes the register bank number of the data area attempting to access to be obtained while referring to the register bank selection table 10 existing in the cache 9 (STEP S104).

The address operational unit 5 selects the page register from the register bank number obtained previously and the register bank address, thus obtaining the extended address from both of the page register data stored in the register bank address and the offset address (STEP S106).

SECOND OPERATION

FIG. 6 shows constitution of the data area access right definition table 11 according to the second embodiment of the present invention. Furthermore, the constitution of the memory address space extension device is the same as that of FIG. 1.

In the first embodiment, the access right of the data area access right definition table 11 of FIG. 4 is only "permissible" or "impermissible". However, in the present embodiment, as shown in FIG. 6, there are four kinds of access right of the data area right definition table 11. The four kinds of access rights are "readable, in-writable", "in-readable, writable", "readable, writable", and "in-readable, in-writable". These points are different from the first embodiment.

Next, there will be explained operation of the present embodiment using concrete example.

When the task whose task ID is 1 (one) attempted to read the data existing in the data area B, since the access right of the data area access right definition table 11 of FIG. 6 is impermissible, it causes the access for the data area B to be not implemented, thus the system error occurs. While when the task whose task ID is 1 (one) attempted to rewrite the data existing in the data area A, since the access right of the data area access right definition table 11 of FIG. 6 is permissible, it causes the register bank number to be obtained while referring to the register bank selection table 10 existing in the cache 9.

Further, a storage unit such as ROM (read only memory) and so forth storing therein a program in a computer system constitutes the memory address space extension device of FIG. 1. Thus the storage unit of the ROM and so forth constitutes a storage medium according to the present invention. The storage medium stores therein the program indicating processing in order to execute operation described in the above respective embodiment.

It is capable of being used an optical disk, a magneto-optical disk, a magnetic recording medium, a semiconductor memory, and so forth as the storage medium.

THIRD OPERATION

Figure 7:
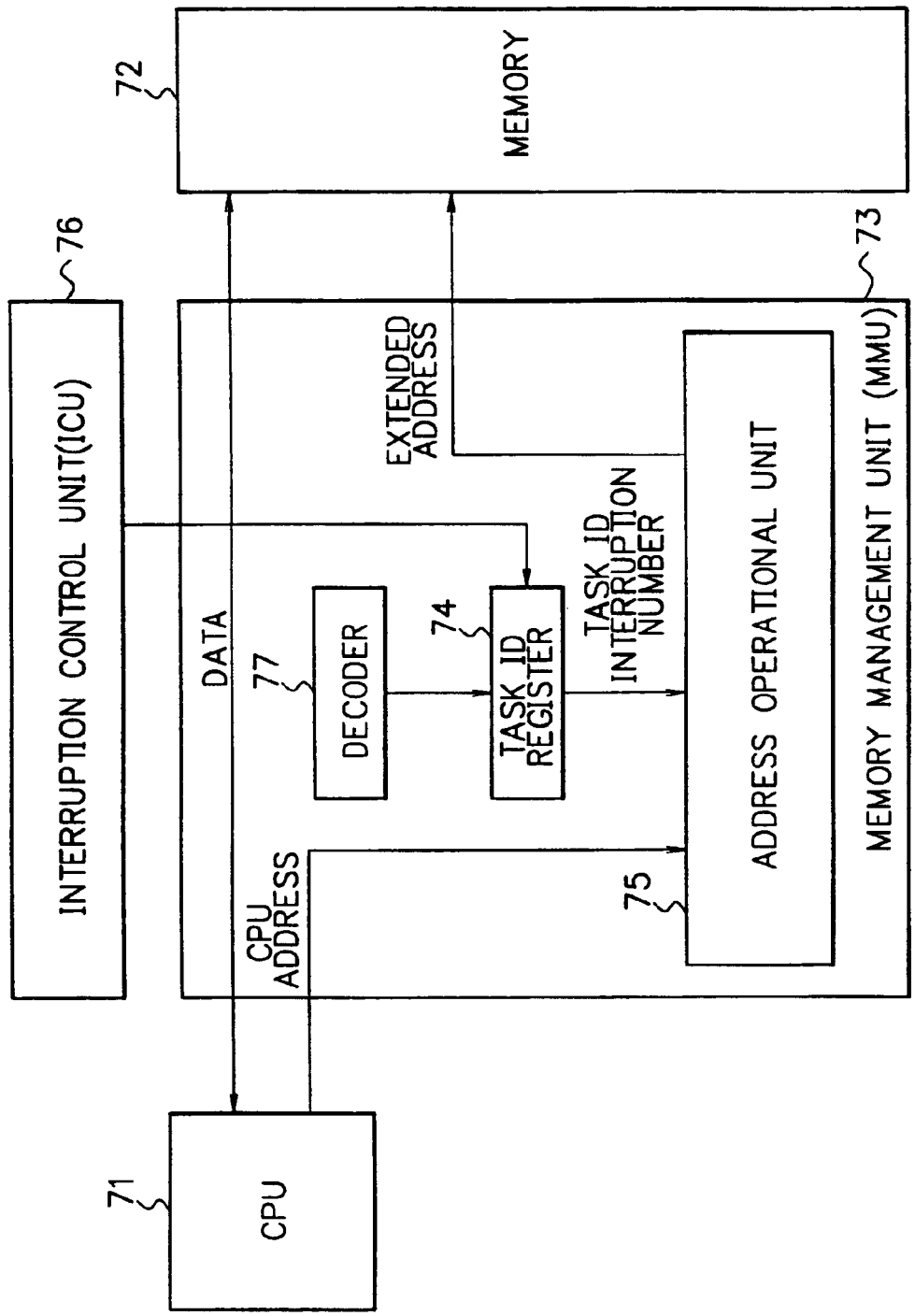
FIG. 7 is a second block diagram showing a configuration of the memory address space extension device in the embodiment of the present invention.

FIG. 7 is a second block diagram showing constitution of the memory address space extension device in the embodiment of the present invention. The memory address space extension device shown in FIG. 7 comprises a CPU 71, a memory 72, a memory management unit (MMU) 73, and an interruption control unit (ICU) 76.

The CPU 71 possesses prescribed address space. The memory 72 possesses an extended address which is address space broader than address space which the CPU 71 possesses.

Further, the memory management unit (MMU) 73 consists of a task ID register 74, an address operational unit 75, and a decoder 77.

The task ID register 74 accommodates task ID of a task which is effective condition. The task ID register 74 accommodates an interruption number of interruption processing during execution too. The address operational unit 75 converts the CPU address into the extended address. The interruption control unit (ICU) 76 produces interruption according to hardware.

FIG. 7 shows the memory address space extension device. Operation in which it causes the extended address to be obtained will be explained in detail referring to FIGS. 2, 3, 5, 7, and 11. The extended address is obtained with respect to the task that is under the condition that access in relation to a certain data area is not permitted. The extended address is also obtained with respect to the task which is under the condition that access is permitted, while preventing wrong access according to interruption processing.

As shown in FIG. 5, on the inside of the memory address space extension device, the linker/locator forms the execution form file from among the object file, the data class in which a plurality of data is gathered, the data class definition file which defines the access right of such that data class (STEP S110). On this occasion, the data whose data class is identical therewith is arranged while collecting.

FIG. 8 is a third data area access right definition table in the embodiment of the present invention. As shown in FIG. 8, with respect to the present embodiment, on the supposition that the task of "101", "102", "103", and "104" exists as the task ID, the interruption processing "1", "2", and "3" exists as the interruption number. Further, on the supposition that there exists "area A", "area B", and "area C" as the data area.

The interruption processing of the interruption numbers "1" and "2" is taken to be the interruption processing according to software. The interruption processing of the interruption number "3" is taken to be the interruption processing according to hardware.

The memory address space extension device shown in FIG. 7 forms the register bank selection table shown in FIG. 3 to the cache 11 on the occasion of initialization. The memory address space extension device also forms the data area access right definition table shown in FIG. 8 to the cache 11 on the occasion of initialization (STEP S111).

When the system operates, OS (Operating System) accommodates the task ID of the task which is under effective condition into the task ID register 74. When the task switch occurs, the OS accommodates the task ID which becomes effective condition according to the task switch into the task ID register 74.

The interruption according to hardware occurs during system operation. On this occasion, the interruption control unit (ICU) 76 produces interruption number. The produced interruption number is accommodated in the task ID register.

The CPU 71 causes the interruption instruction according to the software to be executed. On this occasion, the interruption number which is decoded by the decoder 77 is accommodated in the task ID register 74.

Furthermore, when the instruction for returning from the interruption processing is executed, the CPU 71 accommodates the task ID of the task which is in the effective condition immediately before execution of the interruption processing into the task ID register 74.

The address operational unit 75 decomposes the CPU address inputted from the CPU 71 into the data area ID, the register bank address, and the offset (STEP S112).

The register bank control unit 8 in the address operational unit 75 refers to a data area access right definition table 81 shown in FIG. 8 accommodated the cache 11 according to the task ID stored in the task ID register, or the interruption number and the above described data area ID, thus the register bank control unit 8 requests the access right for the data area with respect to the task during execution (STEP S113).

When the interruption processing of the interruption number "1" is attempted to read the data existing in the area "B", the interruption processing of the interruption number "1" does not possess such the access right according to the data area access right definition table shown in FIG. 8 (STEP S 113/NO).
Consequently, the memory address space extension device shown in FIG. 7 does not execute the access to the data area "B". Namely, the interruption processing of the interruption number "1" described above becomes the system error (STEP S115).

When the interruption processing of the interruption number "1" is attempted to rewrite the data existing in the area "A", the interruption processing of the interruption number "1" is permitted about the access to the data area "A" according to the data area access right definition table 81 shown in FIG. 8 (STEP S113/YES). Consequently, the register bank control unit 8 refers to the register bank selection table 12 within the cache 11 shown in FIG. 3. The register bank control unit 8 requests the register bank number of the data area [area "A"] which is attempted to access by the above interruption processing (the interruption processing of the interruption number "1") (STEP S114).

The address operational unit 75 selects a page register 7 from among the above register bank number, and the above register bank address. The address operational unit 75 obtains the extended address from among the page register data stored in the page register 7, and the above described offset address (STEP S116).

Furthermore, a storage unit such as ROM (read only memory) and so forth storing therein a program in a computer system constitutes the memory address space extension device of FIG. 7. Thus the storage unit of the ROM and so forth constitutes a storage medium according to the present invention. The storage medium stores therein the program indicating processing in order to execute operation described in the above respective embodiment.

It is capable of being used an optical disk, a magneto-optical disk, a magnetic recording medium, a semiconductor memory, and so forth as the storage medium.

According to the first operational example described above, the task ID register stores therein the task ID of the task during execution. Consequently, in the case of the interruption processing, value of the task ID register is not changed. For that reason, the interruption processing becomes capable of accessing to the data to which only predetermined certain task accesses.

Namely, according to the above described first operational example, there exists a data to which only prescribed task is permitted to access. It is incapable of preventing that the wrong interruption processing accesses to such the data.

However, according to the above described third operational example, it causes wrong access to be prevented from the task that the access is not permitted with respect to certain data area. Further, it becomes possible to prevent wrong access according to the interruption processing with respect to certain data area. As a result thereof, reliability of the data is improved in the above data area.

FOURTH OPERATION

FIG. 8 is view showing the fourth data area access right definition table in the embodiment of the present invention.

Hereinafter, there will be described operation of preventing wrong access referring to FIGS. 2, 7, and 9. The memory address space extension device shown in FIG. 7 enable the wrong access to be prevented from the task which is not permitted access with respect to certain data area. Also, the memory address space extension device enable, wrong access according to the interruption processing to be prevented.

Furthermore, the fourth operational example differs from the third operational example described above. The different point is processing concerning the access right judgement of either the task during execution or the interruption processing (processing of STEP S113 shown in FIG. 11). Thus, there will be described with respect to this processing.

The fourth operational example differs from the third operational example in the data area access right definition table. The data area access right definition table 81 shown in FIG. 8 indicates area to which the access right is permitted in every task ID, or in every interruption number.

By contrast, the data area access right definition table 91 shown in FIG. 9 defines the access right with respect to the area that it is capable of executing only write of the data in every task ID, or in every interruption number (In FIG. 9, referred to as "W"). The data area access right definition table defines the access right with respect to the area that it is capable of executing only read of the data (In FIG. 9, referred to as "R"). The data area access right definition table defines the access right with respect to the area that it is capable of executing both of read of the data, and write of the data (In FIG. 9, referred to as "RW").

According to FIG. 9, the interruption processing of the interruption number "1" (one), in the case of attempting to read the data existing in the data area "B", the access right is not recognized (according to FIG. 9, defines as "x"). Consequently, the memory address extension device shown in FIG. 7, does not execute access with respect to the data area "B", but it causes the operation to be terminated as the system error.

According to FIG. 9, the interruption processing of the interruption number "1" (one), in the case of attempting to read the data existing in the data area "A", the access right is recognized (according to FIG. 9, defined as "R"). Consequently, the memory address space extension device shown in FIG. 7 refers to the register bank selection table 12 existing in the cache 11 shown in FIG. 3, before requesting the register bank number of the data area "A" to which the interruption processing of the above interruption number "1" attempts to access.

Furthermore, the storage unit such as ROM (read only memory) and so forth storing therein the program in the computer system constituting the memory address space extension device of FIG. 7 constitutes the storage medium according to the present invention. The storage medium stores therein the program indicating processing in order to execute operation explained on the respective embodiments described-above.

It is capable of being used an optical disk, a magneto-optical disk, a magneto-recording medium, a semiconductor memory, and so forth as the storage medium.

The fourth operational example is compared with the above third operational example. According to the fourth operational example, it becomes possible to implement more detailed access restriction in every task, or in every interruption processing. As a result thereof, reliability of the data is further improved.

As described above according to the present invention, there is provided the table of defining that the access right to permissible or the access right is impermissible by the task with respect to certain data area. Thus, it is capable of preventing wrong access from the task with respect to a certain data area. For that reason, it is capable of protecting the data of the area, thus, it is capable of improving the reliability of the data.

Further, according to the present invention, there is provided a table defining whether the access right is permissible or the access right is impermissible by the task with respect to a certain data area or the interruption processing. Thus, it is capable of preventing wrong access from the task with respect to a certain data area and/or the interruption processing. For that reason, it is capable of protecting the data of the area, thus, it is capable of improving the reliability of the data.

Furthermore, in the above described definition table, it causes combination that the read, and the write with respect to the data area are permissible or impermissible respectively to be defined, thus it is capable of executing fine-grained control in answer to the inputted CPU data.

While preferred embodiments of the invention have been described using specific terms, the description has been for illustrative purposes only, and it is to be understood that changes and variations may be made without departing from the spirit or scope of following claims.

What is claimed is:

1. A memory address space extension device comprising:
   a definition table for defining an access right of a task with respect to a data area;
   a definition table forming means for forming said definition table;
   an access right judgement means for judging, according to said definition table, whether or not the access right to the data area requested by the task should be provided with respect to the task, and said access right judgement means judges whether or not said task is permitted access according to an interruption processing number; and
   an address operational means for converting a CPU address into an extended address, and a memory having the extended address converted previously, said address operational means causing said CPU address to be converted into the extended address when said task is permitted access to said data area according to said access right judgement means, before said memory with extended address supports said address operational means.

2. A memory address space extension device as claimed in claim 1, wherein said definition table defines whether or not said task possesses an access right for accessing a prescribed data area for any task ID associated with the task.

3. A memory address space extension device as claimed in claim 2, wherein said access right judgement means judges whether to permit access to the data area requested by said task according to said task ID, and a data area ID indicating the data area requested by said task.

4. A memory address space extension device as claimed in claim 3, wherein said definition table defines whether or not access is permitted with respect to said prescribed data area in every said task.

5. A memory address space extension device as claimed in claim 4, further comprising an interruption number generation means for generating the interruption processing number with respect to interruption processing according to hardware.

6. A memory address space extension device as claimed in claim 5, further comprising an interruption number decoding means for decoding the interruption processing number from an interruption instruction according to software.

7. A memory address space extension device as claimed in claim 4, further comprising an interruption number decoding means for decoding the interruption processing number from an interruption instruction according to software.

8. A memory address space extension device as claimed in claim 3, wherein said definition table defines any one of:
   (1) causing only writing of the data to be permitted;
   (2) causing reading of the data to be permitted;
   (3) causing writing of the data and reading of the data to be permitted; and
   (4) causing no-access to be permitted,
with respect to said prescribed data area in every said task.

9. A memory address space extension device as claimed in claim 8, further comprising an interruption number generation means for generating the interruption processing number with respect to interruption processing according to hardware.

10. A memory address space extension device as claimed in claim 9, further comprising an interruption number decoding means for decoding the interruption processing number from an interruption instruction according to software.

11. A memory address space extension device as claimed in claim 8, further comprising an interruption number decoding means for decoding the interruption processing number from an interruption instruction according to software.

12. A memory address space extension device as claimed in claim 2, wherein said definition table defines whether or not access is permitted with respect to said prescribed data area in every said task.

13. A memory address space extension device as claimed in claim 12, further comprising an interruption number generation means for generating the interruption processing number with respect to interruption processing according to hardware.

14. A memory address space extension device as claimed in claim 13, further comprising an interruption number decoding means for decoding the interruption processing number from an interruption instruction according to software.

15. A memory address space extension device as claimed in claim 12, further comprising an interruption number decoding means for decoding the interruption processing number from an interruption instruction according to software.

16. A memory address space extension device as claimed in claim 2, wherein said definition table defines any one of:
   (1) causing only writing of the data to be permitted;
   (2) causing reading of the data to be permitted;
   (3) causing writing of the data and reading of the data to be permitted; and
   (4) causing no-access to be permitted,
with respect to said prescribed data area in every said task.

17. A memory address space extension device as claimed in claim 16, further comprising an interruption number generation means for generating the interruption processing number with respect to interruption processing according to hardware.

18. A memory address space extension device as claimed in claim 17, further comprising an interruption number decoding means for decoding the interruption processing number from an interruption instruction according to software.

19. A memory address space extension device as claimed in claim 16, further comprising an interruption number decoding means for decoding the interruption processing number from an interruption instruction according to software.

20. A memory address space extension device as claimed in claim 1, wherein said definition table defines whether or not said task possesses an access right for accessing a prescribed data area for any task ID associated with the task and/or in every interruption processing number.

21. A memory address space extension device as claimed in claim 20, wherein said access right judgement means judges whether to permit access to the data area requested by said task according said interruption processing number, and according to a data area ID indicating the data area requested by said task.

22. A memory address space extension device as claimed in claim 21, further comprising an interruption number decoding means for decoding the interruption processing number from an interruption instruction according to software.

23. A memory address space extension device as claimed in claim 21, wherein said definition table defines whether or not access is permitted with respect to said prescribed data area in every said task.

24. A memory address space extension device as claimed in claim 23, further comprising an interruption number generation means for generating the interruption processing number with respect to interruption processing according to hardware.

25. A memory address space extension device as claimed in claim 24, further comprising an interruption number decoding means for decoding the interruption processing number from an interruption instruction according to software.

26. A memory address space extension device as claimed in claim 23, further comprising an interruption number decoding means for decoding the interruption processing number from an interruption instruction according to software.

27. A memory address space extension device as claimed in claim 21, wherein said definition table defines any one of:
    (1) causing only writing of the data to be permitted;
    (2) causing reading of the data to be permitted;
    (3) causing writing of the data and reading of the data to be permitted; and
    (4) causing no-access to be permitted,
with respect to said prescribed data area in every said task.

28. A memory address space extension device as claimed in claim 27, further comprising an interruption number generation means for generating the interruption processing number with respect to interruption processing according to hardware.

29. A memory address space extension device as claimed in claim 28, further comprising an interruption number decoding means for decoding the interruption processing number from an interruption instruction according to software.

30. A memory address space extension device as claimed in claim 27, further comprising an interruption number decoding means for decoding the interruption processing number from an interruption instruction according to software.

31. A memory address space extension device as claimed in claim 21, further comprising an interruption number generation means for generating the interruption processing number with respect to interruption processing according to hardware.

32. A memory address space extension device as claimed in claim 31, further comprising an interruption number decoding means for decoding the interruption processing number from an integration instruction according to software.

33. A memory address space extension device as claimed in claim 20, wherein said definition table defines whether or not access is permitted with respect to said prescribed data area in every said task.

34. A memory address space extension device as claimed in claim 33, further comprising an interruption number generation means for generating the interruption processing number with respect to interruption processing according to hardware.

35. A memory address space extension device as claimed in claim 34, further comprising an interruption number decoding means for decoding the interruption processing number from an interruption instruction according to software.

36. A memory address space extension device as claimed in claim 33, further comprising an interruption number decoding means for decoding the interruption processing number from an interruption instruction according to software.

37. A memory address space extension device as claimed in claim 20, wherein said definition table defines any one of:
    (1) causing only writing of the data to be permitted;
    (2) causing reading of the data to be permitted;
    (3) causing writing of the data and reading of the data to be permitted; and
    (4) causing no-access to be permitted,
with respect to said prescribed data area in every said task.

38. A memory address space extension device as claimed in claim 37, further comprising an interruption number generation means for generating the interruption processing number with respect to interruption processing according to hardware.

39. A memory address space extension device as claimed in claim 38, further comprising an interruption number decoding means for decoding the interruption processing number from an interruption instruction according to software.

40. A memory address space extension device as claimed in claim 37, further comprising an interruption number decoding means for decoding the interruption processing number from an interruption instruction according to software.

41. A memory address space extension device as claimed in claim 20, further comprising an interruption number generation means for generating the interruption processing number with respect to interruption processing according to hardware.

42. A memory address space extension device as claimed in claim 41, further comprising an interruption number decoding means for decoding the interruption processing number from an interruption instruction according to software.

43. A memory address space extension device as claimed in claim 20, further comprising an interruption number decoding means for decoding the interruption processing number from an interruption instruction according to software.

44. A memory address space extension device as claimed in claim 1, wherein said access right judgement means judges whether it causes the access right to the data area requested by said task to be given according to a task ID, and a data area ID indicating the data area requested by said task.

45. A memory address space extension device as claimed in claim 44, wherein said definition table defines whether or not access is permitted with respect to a prescribed data area in every said task.

46. A memory address space extension device as claimed in claim 45, further comprising an interruption number generation means for generating the interruption processing number with respect to interruption processing according to hardware.

47. A memory address space extension device as claimed in claim 46, further comprising an interruption number decoding means for decoding the interruption processing number from an interruption instruction according to software.

48. A memory address space extension device as claimed in claim 45, further comprising an interruption number decoding means for decoding the interruption processing number from an interruption instruction according to software.

49. A memory address space extension device as claimed in claim 44, wherein said definition table defines any one of:
  (1) causing only writing of the data to be permitted;
  (2) causing reading of the data to be permitted;
  (3) causing writing of the data and reading of the data to be permitted; and
  (4) causing no-access to be permitted,
with respect to a prescribed data area in every said task.

50. A memory address space extension device as claimed in claim 49, further comprising an interruption number generation means for generating the interruption processing number with respect to interruption processing according to hardware.

51. A memory address space extension device as claimed in claim 50, further comprising an interruption number decoding means for decoding the interruption processing number from an interruption instruction according to software.

52. A memory address space extension device as claimed in claim 49, further comprising an interruption number decoding means for decoding the interruption processing number from an interruption instruction according to software.

53. A memory address space extension device as claimed in claim 1, wherein said access right judgement means judge whether to permit access to the data area requested by said task according to said interruption processing number, and according to a data area ID indicating the data area requested by said task.

54. A memory address space extension device as claimed in claim 53, wherein said definition table defines whether or not access is permitted with respect to a prescribed data area in every said task.

55. A memory address space extension device as claimed in claim 54, further comprising an interruption number generation means for generating the interruption processing number with respect to interruption processing according to hardware.

56. A memory address space extension device as claimed in claim 55, further comprising an interruption number decoding means for decoding the interruption processing number from an interruption instruction according to software.

57. A memory address space extension device as claimed in claim 54, further comprising an interruption number decoding means for decoding the interruption processing number from an interruption instruction according to software.

58. A memory address space extension device as claimed in claim 53, wherein said definition table defines any one of:
  (1) causing only writing of the data to be permitted;
  (2) causing reading of the data to be permitted;
  (3) causing writing of the data and reading of the data to be permitted; and
  (4) causing no-access to be permitted,
with respect to a prescribed data area in every said task.

59. A memory address space extension device as claimed in claim 58, further comprising an interruption number generation means for generating the interruption processing number with respect to interruption processing according to hardware.

60. A memory address space extension device as claimed in claim 59, further comprising an interruption number decoding means for decoding the interruption processing number from an interruption instruction according to software.

61. A memory address space extension device as claimed in claim 58, further comprising an interruption number decoding means for decoding the interruption processing number from an interruption instruction according to software.

62. A memory address space extension device as claimed in claim 53, further comprising an interruption number generation means for generating the interruption processing number with respect to interruption processing according to hardware.

63. A memory address space extension device as claimed in claim 62, further comprising an interruption number decoding means for decoding the interruption processing number from an interruption instruction according to software.

64. A memory address space extension device as claimed in claim 53, further comprising an interruption number decoding means for decoding the interruption processing number from an interruption instruction according to software.

65. A memory address space extension device as claimed in claim 1, wherein said definition table defines whether or not access is permitted with respect to a prescribed data area in every said task.

66. A memory address space extension device as claimed in claim 65, further comprising an interruption number generation means for generating the interruption processing number with respect to interruption processing according to hardware.

67. A memory address space extension device as claimed in claim 66, further comprising an interruption number decoding means for decoding the interruption processing number from an interruption instruction according to software.

68. A memory address space extension device as claimed in claim 65, further comprising an interruption number decoding means for decoding the interruption processing number from an interruption instruction according to software.

69. A memory address space extension device as claimed in claim 1, wherein said definition table defines any one of:
  (1) causing only writing of the data to be permitted;
  (2) causing reading of the data to be permitted;
  (3) causing writing of the data and reading of the data to be permitted; and
  (4) causing no-access to be permitted,
with respect to a prescribed data area in every said task.

70. A memory address space extension device as claimed in claim 69, further comprising an interruption number generation means for generating the interruption processing number with respect to interruption processing according to hardware.

71. A memory address space extension device as claimed in claim 40, further comprising an interruption number decoding means for decoding the interruption processing number from an interruption instruction according to software.

72. A memory address space extension device as claimed in claim 69, further comprising an interruption number decoding means for decoding the interruption processing number from an interruption instruction according to software.

73. A memory address space extension device as claimed in claim 1, further comprising an address operational means for converting the CPU address into the extended address, and a memory having the extended address converted previously wherein said address operational means causes said CPU address to be converted into the extended address when said task is permitted access to said data area according to said access right judgement means, before said memory with extended address supports said address operation means.

74. A storage medium storing therein a program in order to execute the processing of:
- a definition table preparation for preparing a definition table;
- a reference processing for said definition table which defines an access right of a task with respect to a data area; and
- an access right judgement processing for judging whether or not said task is permitted access for the data area requested by said task according to said definition table, and said access right judgement processing judges whether or not said task is permitted access according to an interruption processing number,
- wherein said program executes an address operational processing in order to convert a CPU address into an extended address such that said CPU address is converted into said extended address when it is judged that said task is permitted access to said data area according to said access right judgement processing, before executing supporting processing by a memory with the extended address.

75. A storage medium storing therein a program as claimed in claim 74, wherein said reference processing for said definition table causes said definition table to define whether or not said task possesses the access right for accessing a prescribed data area to be seen for any task ID associated with said task.

76. A storage medium storing therein a program as claimed in claim 75, wherein said access right judgement processing judges whether or not said task possesses the access right for accessing said prescribed data area according to said task ID and/or a data area ID indicating the data area requested by said task.

77. A storage medium storing therein a program as claimed in claim 76, wherein said reference processing for said definition table causes said definition table to define whether or not said task possesses the access right for accessing said prescribed data area to be seen in every said task.

78. A storage medium storing therein a program as claimed in claim 77, wherein said program further executes interruption number generation processing for generating the interruption processing number to interruption processing according to hardware.

79. A storage medium storing therein a program as claimed in claim 78, wherein said program further executes interruption number decoding processing for decoding the interruption processing number from an interruption instruction according to software.

80. A storage medium storing therein a program as claimed in claim 77, wherein said program further executes interruption number decoding processing for decoding the interruption processing number from an interruption instruction according to software.

81. A storage medium storing therein a program as claimed in claim 76, wherein said reference processing for said definition table causes any one of:
(1) allowing only writing of the data to be permitted;
(2) allowing reading of the data to be permitted;
(3) allowing writing of the data and reading of the data to be permitted; and
(4) allowing no-access to be permitted,
to be seen with respect to said prescribed data area in every said task.

82. A storage medium storing therein a program as claimed in claim 81, wherein said program further executes interruption number generation processing for generating the interruption processing number to interruption processing according to hardware.

83. A storage medium storing therein a program as claimed in claim 82, wherein said program further executes interruption number decoding processing for decoding the interruption processing number from an interruption instruction according to software.

84. A storage medium storing therein a program as claimed in claim 81, wherein said program further executes interruption number decoding processing for decoding the interruption processing number from an interruption instruction according to software.

85. A storage medium storing therein a program as claimed in claim 75, wherein said reference processing for said definition table causes said definition table to define whether or not said task possesses the access right for accessing said prescribed data area to be seen in every said task.

86. A storage medium storing therein a program as claimed in claim 85, wherein said program further executes interruption number generation processing for generating the interruption processing number to interruption processing according to hardware.

87. A storage medium storing therein a program as claimed in claim 86, wherein said program further executes interruption number decoding processing for decoding the interruption processing number from an interruption instruction according to software.

88. A storage medium storing therein a program as claimed in claim 85, wherein said program further executes interruption number decoding processing for decoding the interruption processing number from an interruption instruction according to software.

89. A storage medium storing therein a program as claimed in claim 75, wherein said reference processing for said definition table causes any one of:
(1) allowing only writing of the data to be permitted;
(2) allowing reading of the data to be permitted;
(3) allowing writing of the data and reading of the data to be permitted; and
(4) allowing no-access to be permitted,
to be seen with respect to said prescribed data area in every said task.

90. A storage medium storing therein a program as claimed in claim 89, wherein said program further executes interruption number generation processing for generating the interruption processing number to interruption processing according to hardware.

91. A storage medium storing therein a program as claimed in claim 90, wherein said program further executes interruption number decoding processing for decoding the interruption processing number from an interruption instruction according to software.

92. A storage medium storing therein a program as claimed in claim 89, wherein said program further executes interruption number decoding processing for decoding the interruption processing number from an interruption instruction according to software.

93. A storage medium storing therein a program as claimed in claim 74, wherein said reference processing said definition table causes the definition table defining whether or not said task possesses the access right for accessing a prescribed data area to be seen for any task ID given to said task and/or in every interruption number.

94. A storage medium storing therein a program as claimed in claim 93, wherein said reference processing for said definition table causes said definition table to define whether or not said task possesses the access right for accessing said prescribed data area to be seen in every said task.

95. A storage medium storing therein a program as claimed in claim 94, wherein said program further executes interruption number generation processing for generating the interruption processing number to interruption processing according to hardware.

96. A storage medium storing therein a program as claimed in claim 95, wherein said program further executes interruption number decoding processing for decoding the interruption processing number from an interruption instruction according to software.

97. A storage medium storing therein a program as claimed in claim 94, wherein said program further executes interruption number decoding processing for decoding the interruption processing number from an interruption instruction according to software.

98. A storage medium storing therein a program as claimed in claim 93, wherein said reference processing for said definition table causes any one of:
  (1) allowing only writing of the data to be permitted;
  (2) allowing reading of the data to be permitted;
  (3) allowing writing of the data and reading of the data to be permitted; and
  (4) allowing no-access to be permitted,
to be seen with respect to said prescribed data area in every said task.

99. A storage medium storing therein a program as claimed in claim 98, wherein said program further executes interruption number generation processing for generating the interruption processing number to interruption processing according to hardware.

100. A storage medium storing therein a program as claimed in claim 99, wherein said program further executes interruption number decoding processing for decoding the interruption processing number from an interruption instruction according to software.

101. A storage medium storing therein a program as claimed in claim 98, wherein said program further executes interruption number decoding processing for decoding the interruption processing number from an interruption instruction according to software.

102. A storage medium storing therein a program as claimed in claim 93, wherein said program further executes interruption number generation processing for generating the interruption processing number to interruption processing according to hardware.

103. A storage medium storing therein a program as claimed in claim 102, wherein said program further executes interruption number decoding processing for decoding the interruption processing number from an interruption instruction according to software.

104. A storage medium storing therein a program as claimed in claim 93, wherein said program further executes interruption number decoding processing for decoding the interruption processing number from an interruption instruction according to software.

105. A storage medium storing therein a program as claimed in claim 74, wherein said access right judgement processing judges whether or not said task possesses the access right for accessing a prescribed data area according to a task ID and/or a data area ID indicating the data area requested by said task.

106. A storage medium storing therein a program as claimed in claim 105, wherein said reference processing for said definition table causes said definition table to define whether or not said task possesses the access right for accessing said prescribed data area to be seen in every said task.

107. A storage medium storing therein a program as claimed in claim 106, wherein said program further executes interruption number generation processing for generating the interruption processing number to interruption processing according to hardware.

108. A storage medium storing therein a program as claimed in claim 107, wherein said program further executes interruption number decoding processing for decoding the interruption processing number from an interruption instruction according to software.

109. A storage medium storing therein a program as claimed in claim 106, wherein said program further executes interruption number decoding processing for decoding the interruption processing number from an interruption instruction according to software.

110. A storage medium storing therein a program as claimed in claim 105, wherein said reference processing for said definition table causes any one of:
  (1) allowing only writing of the data to be permitted;
  (2) allowing reading of the data to be permitted;
  (3) allowing writing of the data and reading of the data to be permitted; and
  (4) allowing no-access to be permitted,
to be seen with respect to said prescribed data area in every said task.

111. A storage medium storing therein a program as claimed in claim 110, wherein said program further executes interruption number generation processing for generating the interruption processing number to interruption processing according to hardware.

112. A storage medium storing therein a program as claimed in claim 111, wherein said program further executes interruption number decoding processing for decoding the interruption processing number from an interruption instruction according to software.

113. A storage medium storing therein a program as claimed in claim 110, wherein said program further executes interruption number decoding processing for decoding the interruption processing number from an interruption instruction according to software.

114. A storage medium storing therein a program as claimed in claim 74, wherein said reference processing for said definition table causes said definition table to define whether or not said task possesses the access right for accessing a prescribed data area to be seen in every said task.

115. A storage medium storing therein a program as claimed in claim 114, wherein said program further executes interruption number generation processing for generating the interruption processing number to interruption processing according to hardware.

116. A storage medium storing therein a program as claimed in claim 115, wherein said program further executes interruption number decoding processing for decoding the interruption processing number from an interruption instruction according to software.

117. A storage medium storing therein a program as claimed in claim 114, wherein said program further executes interruption number decoding processing for decoding the interruption processing number from an interruption instruction according to software.

118. A storage medium storing therein a program as claimed in claim 74, wherein said reference processing for said definition table causes any one of:

(1) allowing only writing of the data to be permitted;

(2) allowing reading of the data to be permitted;

(3) allowing writing of the data and reading of the data to be permitted; and (4) allowing no-access to be permitted, to be seen with respect to a prescribed data area in every said task.

119. A storage medium storing therein a program as claimed in claim 118, wherein said program further executes interruption number generation processing for generating the interruption processing number to interruption processing according to hardware.

120. A storage medium storing therein a program as claimed in claim 119, wherein said program further executes interruption number decoding processing for decoding the interruption processing number from an interruption instruction according to software.

121. A storage medium storing therein a program as claimed in claim 118, wherein said program further executes interruption number decoding processing for decoding the interruption processing number from an interruption instruction according to software.

122. A storage medium storing therein a program as claimed in claim 74, wherein said program further executes interruption number generation processing for generating the interruption processing number to interruption processing according to hardware.

123. A storage medium storing therein a program as claimed in claim 122, wherein said program further executes interruption number decoding processing for decoding the interruption processing number from an interruption instruction according to software.

124. A storage medium storing therein a program as claimed in claim 74, wherein said program further executes interruption number decoding processing for decoding the interruption processing number from an interruption instruction according to software.

\* \* \* \* \*